United States Patent [19]

Nakatsuka et al.

[11] Patent Number: 4,975,839
[45] Date of Patent: Dec. 4, 1990

[54] INSTRUCTION DECODE METHOD AND ARRANGEMENT SUITABLE FOR A DECODER OF MICROPROCESSORS

[75] Inventors: Yasuhiro Nakatsuka; Takashi Hotta, both of Hitachi; Tadaaki Bandoh, Ibaraki; Yoshiki Fujioka, Aichi, all of Japan

[73] Assignee: Hitachi, Ltd., Tokyo, Japan

[21] Appl. No.: 204,299

[22] Filed: Jun. 9, 1988

[30] Foreign Application Priority Data

Jun. 12, 1987 [JP] Japan .................... 62-145092

[51] Int. Cl.$^5$ .................... G06F 3/00; G06F 15/20; G06F 13/00
[52] U.S. Cl. .................... 364/200; 364/900; 364/259.9; 364/262.4; 364/942.8; 364/944.5; 364/946.2
[58] Field of Search ............... 364/200, 200 MS File, 364/900 MS File; 368/47

[56] References Cited

U.S. PATENT DOCUMENTS

| | | | |
|---|---|---|---|
| 4,065,808 | 12/1977 | Schomberg et al. | 364/200 |
| 4,160,289 | 7/1979 | Bambara et al. | 364/200 |
| 4,234,958 | 11/1980 | Pipes et al. | 368/47 |
| 4,422,141 | 12/1983 | Shoji | 364/200 |
| 4,713,749 | 12/1987 | Magar et al. | 364/200 |

*Primary Examiner*—Michael R. Fleming
*Assistant Examiner*—Gopal C. Ray
*Attorney, Agent, or Firm*—Antonelli, Terry, Stout & Kraus

[57] ABSTRACT

An instruction decode method and arrangement suitable for a high-speed microprocessor are disclosed. The instruction decode arrangement comprises a high-speed PLA decoder of small capacity for decoding an instruction word having a small execution cycle, a low-speed PLA decoder of large capacity for decoding an instruction word having a large execution cycle, and a circuit for activating the low-speed PLA decoder to cause it to execute instruction decoding when the high-speed PLA decoder is not permitted for the execution of instruction decoding. Instantaneous current noises generated in the PLA decoders can be mitigated to avoid erroneous operations without degrading averaged decoding performance, thereby permitting the microprocessor to operate at high speeds.

11 Claims, 6 Drawing Sheets

INSTRUCTION DECODE METHOD AND ARRANGEMENT SUITABLE FOR A DECODER OF MICROPROCESSORS

BACKGROUND OF THE INVENTION

This invention relates to an instruction decode unit of computers and more particularly to instruction decode method and arrangement suitable for a decoder of high-speed microprocessors.

Conventionally, in this type of arrangement, data sent from an instruction register is supplied to a single instruction decoder and decoded thereby, as disclosed in JP-B-62-11734 based on U.S. patent application Ser. No. 6174 filed Jul. 30, 1979.

Generally, when the machine cycle or the fundamental unit of operation of the microprocessor is reduced, noise is generated and power consumption is increased. The prior art arrangement does not however take into account the desirability of preventing the noise and reducing the power consumption, and so high-speed operation is difficult to achieve in such an arrangement.

For example, in order to ensure high-speed operation of a processor having an instruction decoder formed of a programmable logic array (PLA), the PLA must be a dynamic NOR-NOR type PLA.

This type of PLA has two planes of NOR logic arrays connected in series and the NOR logic array having word wires which are identical in number to the outputs and which are charged in advance is operated by drawing out electric charges from all word wires which do not meet a specified condition.

In charging and discharging the word wires, a potential drop in the power supply is caused by an instantaneous current flow and the thus caused potential drop increase in proportion to the operation speed to generate noises affecting other logic components. In addition, the amount of electric charges which are moved during charge/discharge of the word wires leads to a power consumption which also increases in proportion to the operation speed.

U.S. Pat. No. 4,160,289 proposes a microprogram control unit in which the output circuit of a microinstruction memory incorporates a primary decoder and a secondary decoder and the latter is activated in response to a switching command produced from the former. This proposal simply employs two stages of decoders for decoding instructions, especially, microinstructions and has no improvement over the first-mentioned prior art arrangement with respect to prevention of noise and reduction of power consumption.

SUMMARY OF THE INVENTION

An object of this invention is to provide instruction decode method and arrangement which can suppress the noise and power consumption to reduce the machine cycle.

According to the invention, a feature to accomplish the above object is that the instruction decode unit of a microprocessor comprises a high-speed decoder of small capacity having a few word wires operable at n cycles and a low-speed decoder of large capacity having many word wires operable at m cycles, where n and m are integers and m>n, and the former is adapted to decode an instruction having a small address computation execution cycle (less than m cycles) and the latter is adapted to decode an instruction having a large address computation execution cycles (more than m cycle).

The output signal of the high-speed decoder contains a signal indicating whether an input instruction has been decoded by this decoder, and when decoding is completed by this decoder, the output of the high-speed decoder connects to the output of the instruction decoder unit and when decoding is not completed by the high-speed decoder, the low-speed decoder is started and the output of this decoder connects to the output of the instruction decoder unit.

Instruction data is sent from an instruction storage to the input of the high-speed decoder and to a register preceding the low-speed decoder and adapted to hold the instruction data. The high-speed decoder decodes the data in n cycles and the instruction hold register retains its output signal until it receives the next instruction.

Decoded output bit lines from the output of the high-speed decoder contains at least one signal line for delivery of a kind of flag indicative of completion of decoding by the high-speed decoder in addition to a decoded result of instruction and when the flag is set, a selector for selecting the outputs of the decoders selects the output of the high-speed decoder as the output of the instruction decoder unit so that the instruction decode result is obtained at n cycles. Conversely, when the flag is "0" indicating that the high-speed decoder is not permitted to decode an instruction, the selector responsive to the "0" flag signal selects the output of the low-speed decoder and the selection is held. The flag "0" flag signals also starts the low-speed decoder to cause it to decode an output signal of the instruction hold register. Where the two decoders are formed of dynamic PLA's, the low-speed decoder can use an interval of time ranging from start of the high-speed decoder to start of the low-speed decoder, less than an m-th cycle, as a charge-up period for the PLA and an interval of time ranging from the completion of charge-up to the end of the m-th cycle as a discharge period for the PLA. Eventually, the PLA low-speed decoder decodes an instruction at m cycles, that is, it takes m cycles to decode the instruction. Accordingly, the charge/discharge period for the PLA word wire can be prolonged and the noise due to the charge/discharge can advantageously be suppressed. On the other hand, the PLA high-speed decoder repeats charge/discharge at the rate of n cycles but its small capacity affects the generation of noise to a lesser extent. When the high-speed decoder completes decoding, there is no need for discharging the large capacity word wire of the PLA low-speed decoder and the effect of reducing power consumption can be attained. In place of the PLA's, a high-speed ROM may be used as the high-speed decoder and a low-speed ROM as the low-speed decoder. In this alternative, instantaneous concentration of signal currents can be prevented to reduce noise.

DESCRIPTION OF THE PREFERRED EMBODIMENTS

The invention will now be described by way of example with reference to FIGS. 1 to 5.

Figure 1:
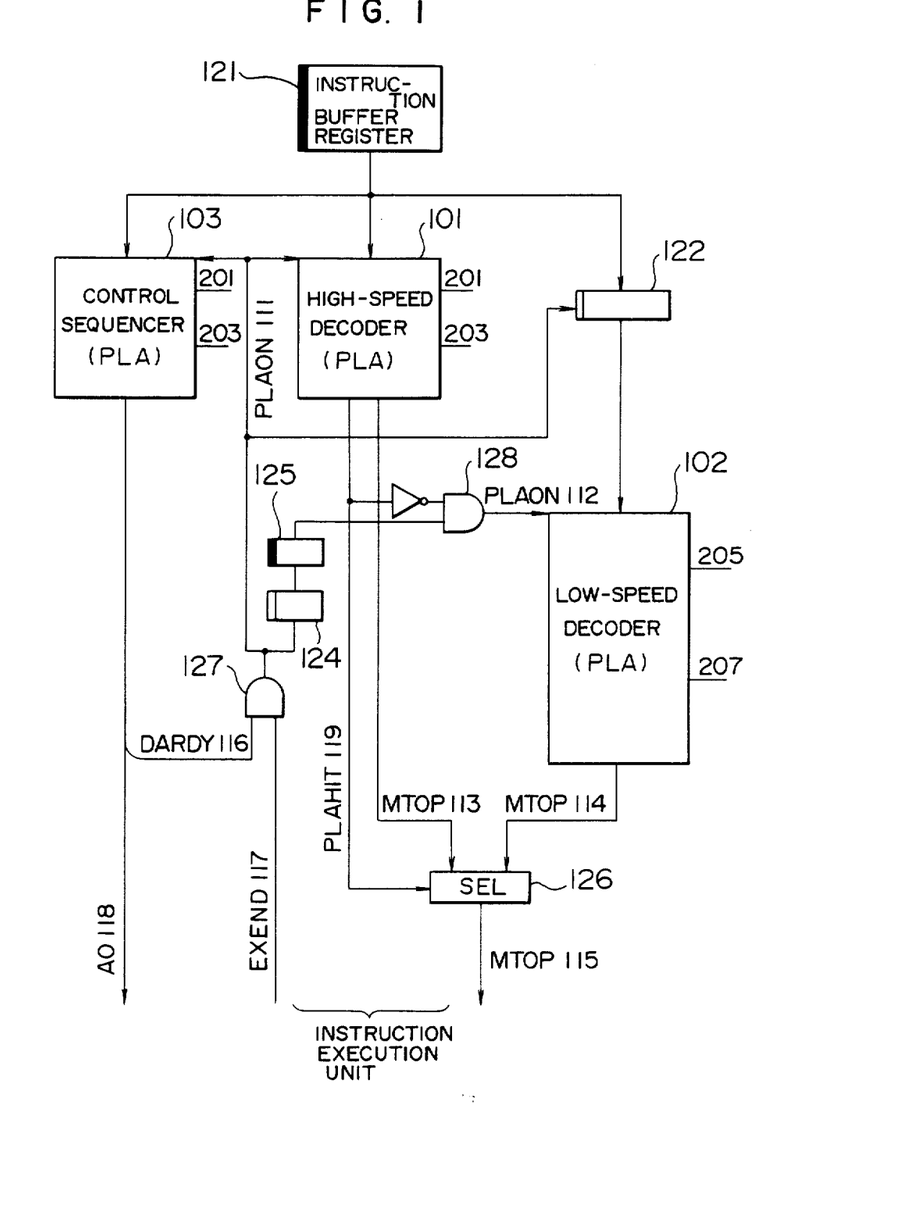
FIG. 1 is a schematic diagram illustrating an instruction decode unit according to an embodiment of the invention.

FIG. 1 particularly illustrates an instruction decode unit according to an embodiment of the invention. The instruciton decode unit comprises an instruction buffer register 121 for storing an instruction word sent from an external storage or an external processor, a control sequencer (PLA) 103 for controlling an address computation processing unit, a high-speed instruction decoder (PLA) 101 operable at one clock cycle, a low-speed instruction decoder (PLA) 102 operable at three clock cycles, a register (shift register) 122 for holding input data to the decoder 102, and a selector 126 for selecting either one of the outputs of the decoders 101 and 102. Preferably, these components may be formed as part of a microprocessor on a single semiconductor substrate. The control sequencer 103 generates a control signal (for address operation) AO 118 applied to the address computation processing unit. The output signal of sequencer 103 also contains a signal DARDY 116 indicative of the fact that the address computation processing ends, and the sequencer 103 delivers out the signal DARDY 116 after completion of delivery of the signal AO 118 over a number of cycles necessary for the address computation. An AND circuit 127 ANDs the signal DARDY 116 and a signal EXEND 117 indicative of the fact that an instruction execution unit ends its processing to produce an instruction decoding start signal PLAON 111. Only when receiving the signal PLAON 111, the decoder 101 is permitted to access the register 121 so as to generate a decoded instruction output signal MTOP 113 and a signal PLAHIT which indicates that the instruction in question has been decoded. The polarity of the signal PLAHIT 119 is inverted to provide a signal which conditions start of the decoder 102. When the PLAHIT 119 is asserted, the selector 126 adapted to select either one of the outputs of the decoders 101 and 102 is permitted to select the output signal MTOP 113 of the decoder 101 so as to deliver out a decoder result signal MTOP 115. Since the output MTOP 113 of the decoder 101 remains unchanged until the next signal PLAON 111 is applied to the decoder 101, the selector 126 keeps delivering out the MTOP 115. Conversely, when the PLAHIT 119 is negated, the selector 126 selects an output signal MTOP 114 of the decoder 102. The output signal MTOP 114 also remains unchanged until reception of the next PLAON 111 by the decoder 101 and consequently the selector 126 continues to deliver out a signal MTOP 115. A start signal PLAON 112 for start of the decoder 102 is enabled on condition that the PLAHIT 119 is negated one cycle after the application of PLAON 111 to the decoder 101. This condition of one cycle after the application of PLAON 111 can be obtained by means of shift registers 124 and 125 of master/slave configuration.

Figure 2:
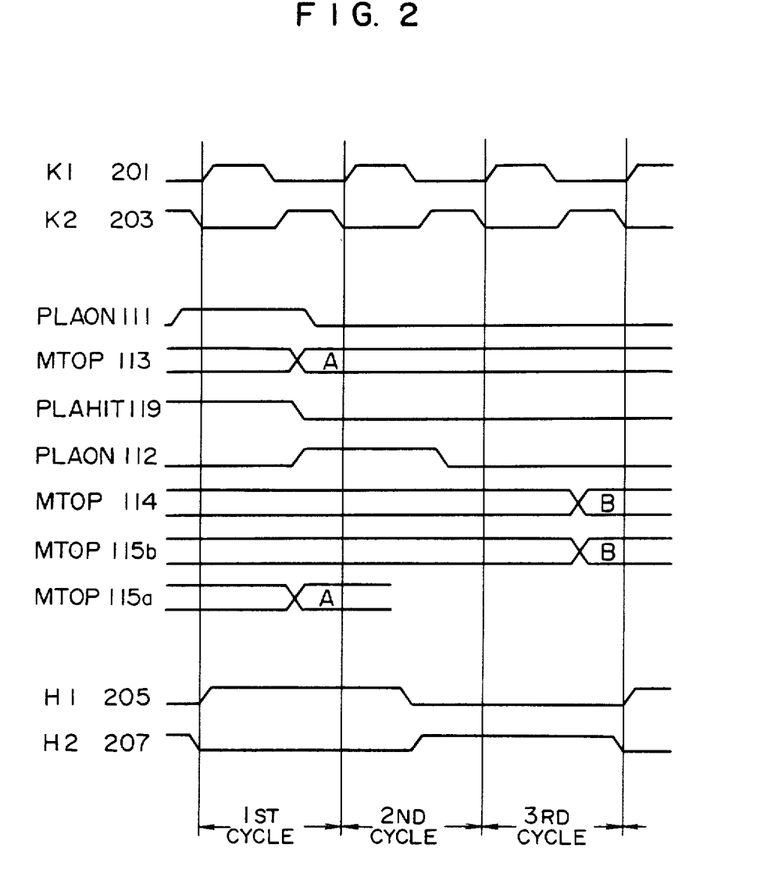
FIG. 2 is a timing chart for explaining the PLA operation in the FIG. 1 unit.

In this embodiment, the sequencer 103 and decoder 101 are driven by clocks 201 and 203 which are fundamental clocks K1 201 and K2 203 as shown in FIG. 2 and the decoder 102 is driven by clocks 205 and 207 which are special clocks H1 205 and H2 207 specified for low-speed decoding, also shown in FIG. 2. The special clocks H1 205 and H2 207 occur at a rate which is ⅓ of the rate for the fundamental clocks K1 201 and K2 203 and therefore the decoder 102 operates at a ⅓ lower speed than the speed of the decoder 101. The decoder 101 takes one cycle before it produces the output signal MTOP 113 following the application of the PLAON 111 to the decoder 101 and the decoder 102 takes three cycles before it produces the output signal MTOP 114 following the application of the PLAON 111 to the decoder 101.

Referring to a timing chart of FIG. 2, in the instruction decode unit of FIG. 1, the decoded output signal MTOP 113 and the PLAHIT 119 indicative of whether the decoder 102 is enabled for execution are settled when one cycle has run after assertion of the PLAON 111. This leads to settlement of the PLAON 112 and 2 cycles after the settlement of the PLAON 112, the MTOP 114 is settled.

The MTOP 115 takes the form of a MTOP 115a when the PLAHIT 119 is asserted and it takes the form of a MTOP 115b when the PLAHIT 119 is negated.

Figure 3:
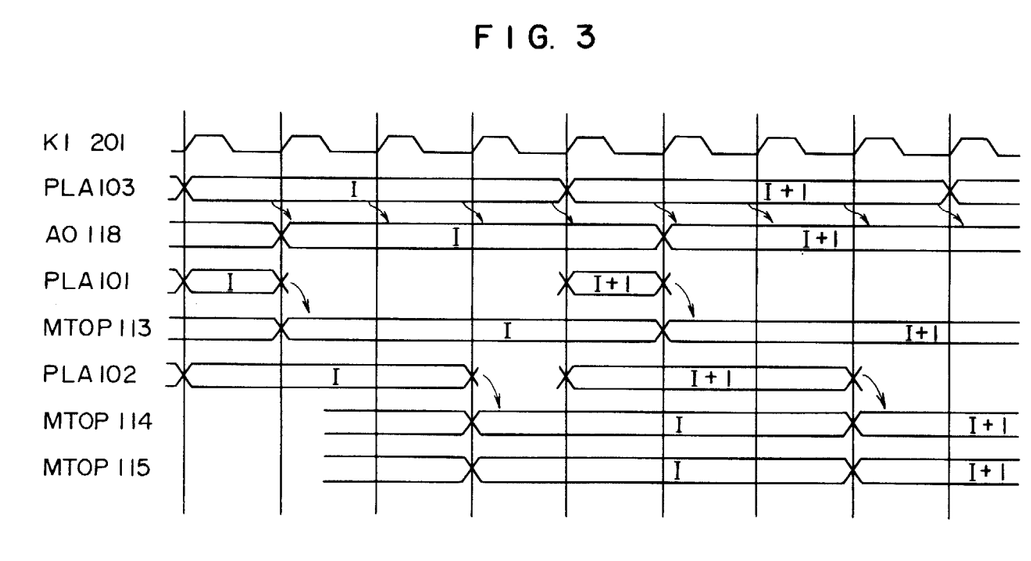
FIG. 3 is a timing chart for explaining the decode operation of an instruction requiring address computation.

FIG. 3 illustrates the operation timing of the individual components of the FIG. 1 circuit by referring to an instance where instructions I, I+1 and I+2 sequentially occur which require the address computation executing unit of a pipe-line control computer to execute address computation. In this case, the PLA 101 cannot decode and three cycles have run before a MTOP 115 is delivered out. Advantageously, however, the address computation sequencer 103 on the other hand issues the output signal AO 118 over three cycles or more in order to perform the address computation and the low-speed delivery of the MTOP 115 can be covered by the three or more cycles for address computation without inviting degradation in performance.

Figure 4:
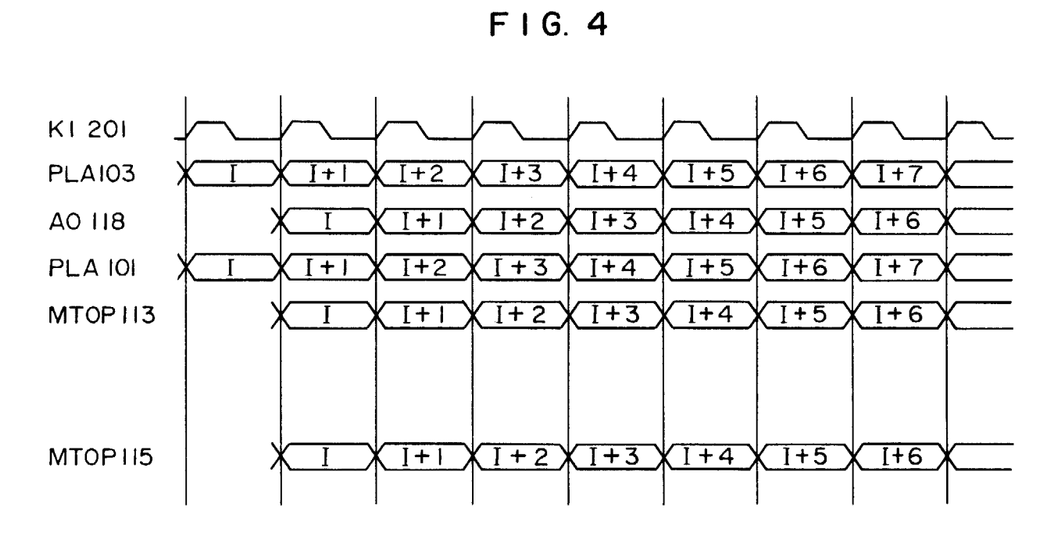
FIG. 4 is a timing chart for explaining the decode operation of an instruction not requiring address computation.

FIG. 4 shows an instance where instructions sequentially occur which do not require address computation. In this case, the decoder 101 is permitted to decode each instruction at the rate of one cycle and a MTOP 115 can be obtained every cycle.

Figure 5:
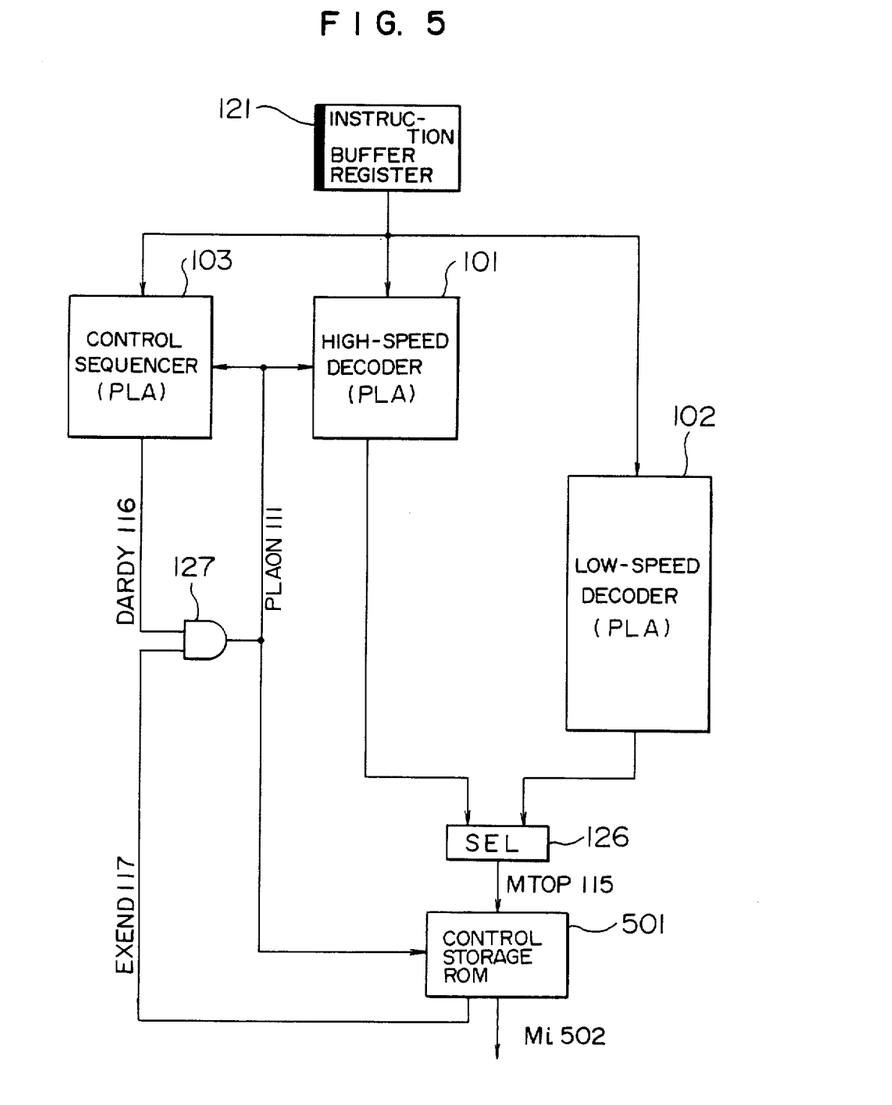
FIG. 5 is a circuit block diagram illustrating the connection between the instruction decoder and the instruction execution unit in a pipe-line computer.
Figure 6:
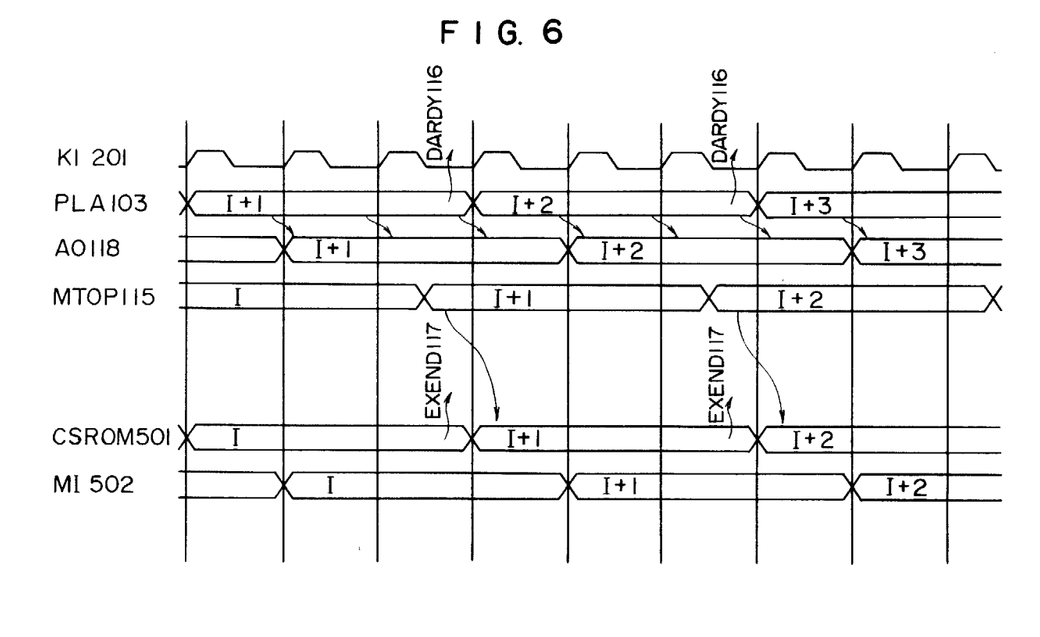
FIG. 6 is a timing chart for explaining the relation between decode results and the operation of the instruction execution unit.

The output signal MTOP 115 generated in the manner described above may be used in the pipe-line computer, as exemplified in a circuit blcok diagram of FIG. 5. FIG. 6 is a timing chart for explaining the operation of the FIG. 5 circuit. Before the sequencer 103 delivers out the DARDY 116 following completion of address computation of an (I+1)th instruction, an output signal MTOP 115 representative of the (I+1)th instruction is settled.

On the other hand, the instruction executing unit executes an Ith instruction independently of the address computation. The Ith instruction can be executed by reading out, from a read only memory 201 for microinstruction storage, a microprogram Mi 502 having as the head address the MTOP 115 representative of the Ith instruction which has precedently been produced from the instruction decoder. Thus, the address computation of the (I+1)th instruction and the execution of the Ith instruction are carried out simultaneously. When the DARDY 116 is delivered following completion of the address computation of the (I+1)th instruction and when the EXEND 117 is delivered following completion of the execution of the Ith instruction, the PLAON 111 is generated and as a result the sequencer 103 and decoder 101 fetch an (I+2)th instruction from the instruction buffer register 121, the sequencer 103 executes address computation of the (I+2)th instruction, and an output signal MTOP 115 representative of the (I+1)th instruction is applied from the instruction decoder to the ROM 501 in order to execute the (I+1)th instruction. In this way, the address computation and the instruction execution are always carried out in parallel.

As described above, according to the present invention, the capability of each of the decoders can be shared in accordance with the size of the instruction to mitigate noises attendant on driving of the decoders and can suppress power consumption, thereby permitting high-speed decoding. It should be understood that the instruction may be shared by high-speed and low-speed decoders in the form of ROM's substituting for PLA's to attain the same effects.

We claim:

1. A method of decoding instructions in a processor having means for storing an instruction word and decode means, including a first decoder capable of decoding an instruction word in n cycles and a second decoder capable of decoding an instruction word in m cycles, where m and n are integers and m>n, for fetching the stored instruction word to generate a head address, corresponding to the fetched instruction word, of a microprogram, said method comprising the steps of:
supplying an instruction word in parallel to said first decoder and to said second decoder;
decoding in said first decoder an instruction word supplied thereto when said first decoder is capable of decoding said instruction word;
generating, by said first decoder, either first information indicative of a capability of said first decoder to decode an instruction word supplied thereto or second information indicative of an incapability of said first decoder to decode said instruction word supplied thereto;
starting said second decoder in response to said second information to decode said instruction word in said second decoder; and
selecting one of the outputs of said first and second decoders in accordance with said first information and second information, respectively, to deliver out a decoder result.

2. An instruction decode method according to claim 1 wherein said first decoder operates to decode only an instruction having an execution cycle which is n or less cycles and said second decoder is permitted to decodes an instruction having an execution cycle which is m or more cycles, so that the decoded result can be obtained at n cycles or m cycles.

3. An instruction decode method according to claim 1 wherein the m cycles are set to be equal to 3n cycles.

4. An instruction decode method according to claim 2 wherein said instruction word comprises, at a relatively high frequency, instructions executable at a smaller number of cycles and contains, at a relatively low frequency, instructions executable at a larger number of cycles.

5. An instruction decode method according to claim 1 wherein address data to be executed over m cycles or more in an address computation processing carried out in parallel with instruction decoding is executed by means of said second decoder.

6. A processor having means for storing an instruction word and a decode arrangement for fetching the stored instruction word to generate a head address, corresponding to the fetched instruction word of a microprogram, said decode arrangement comprising:
a first decoder operable to decode an instruction word in n cycles and a second decoder operable to decode an instruction word in m cycles, where n and m are integers and m>n;
means coupled to said storing means for supplying an instruction word in common to said first and second decoders;
decode status indicating means, responsive to said instruction word, for generating either first information indicative of ability of said first decoder to decode a received instruction word within n cycles or second information indicative of inability of said first decoder to decode said received instruction word within n cycles;
start means, responsive to said second information generated from said decode status indicating means, for starting said second decoder to decode said received instruction word; and
selection means for selecting a decode output of said first decoder when said first information is generated from said decode status indicating means and a decode output of said second decoder when said second information is generated.

7. A processor according to claim 6 wherein said first decoder comprises a first programmable logic array of high speed and small capacity and said second decoder comprises a second programmable logic array of low speed and large capacity, and further comprising a third programmable logic array for controlling the operation timing of said first and second programmable logic arrays, said first, second and third programmable logic arrays being connected to receive said instruction word from said storing means in parallel.

8. A processor according to claim 7 wherein said instruction word from said storing means is applied to said second decoder through a shift register operable at n cycles.

9. A processor according to claim 6 wherein said first decoder comprises a read only memory (ROM) of high speed and small capacity and said second decoder comprises a ROM of low speed and large capacity.

10. A method of decoding instructions in a processor having a buffer for storing an instruction word and a decode unit for fetching and decoding the stored instruction word, said decode unit including a first decoder capable of decoding an instruction word in n cycles and a second decoder capable of decoding an instruction word in m cycles, where m and n are integers and m>n, said method comprising the steps of:
supplying an instruction word from said buffer in parallel to said first decoder and to said second decoder;
generating an instruction decode start signal;
decoding in said first decoder an instruction word supplied thereto from said buffer in response to said instruction decode start signal if said first decoder is capable of decoding the instruction word;
generating as a result of decoding of said instruction word by said first decoder either a first signal indicative of a capability of said first decoder to decode said instruction word or a second signal indicative of an incapability of said first decoder to decode said instruction word; and enabling said second decoder to decode said instruction word in response to said second signal.

11. A processor having means for storing an instruction word and a decode arrangement for fetching the stored instruction word to generate a head address, corresponding to the fetched instruction word, of a microprogram, said decode arrangement comprising:

a first decoder operable to decode an instruction word in n cycles and a second decoder operable to decode an instruction word in m cycles, where n and m are integers m>n;

means coupled to said storing means for supplying an instruction word in common to said first and second decoders;

decode status indicating means, responsive to said instruction word, for generating either first information indicative of ability of said first decoder to decode a received instruction word within n cycles or second information indicative of inability of said first decoder to decode said received instruction word within n cycles; and start means, responsive to said second information generated from said decode status indicating means, for starting said second decoder to decode said received instruction word.

* * * * *